Patented May 12, 1942

2,282,882

UNITED STATES PATENT OFFICE 2,282,882

GEL COMPOSITION AND METHOD OF PREPARATION

Winton I. Patnode, Schenectady, N. Y., assignor to General Electric Company, a corporation of New York No Drawing. Application May 28, 1938, Serial No. 210,798

12 Claims. (Cl. 260—32)

The present invention comprises organic compositions which are characterized by being liquid when in a formative state and of being convertible to semi-solid, elastic gels which are capable of retaining their semi-solid condition when heated to elevated temperatures.

Compositions embodying my invention are suitable for casting or pouring into intricate forms or crevices and are suitable for various uses, for example as insulating and dielectric elements in transformers, capacitors, electrical terminals or bushings, cables, or other electric devices; for lubricating purposes; for the manufacture of inking rollers and pads; for vibration dampers; for sealing purposes; and for charging or filling artillery projectiles with materials which would affect the trajectory of the shell if in liquid form.

Gels, heretofore, have been made by adding a gelling agent to a relatively large volume of liquid at an elevated temperature, the gel being formed when the composition cools. An example is the addition of a soap to non-heat-convertible oil, such as mineral oil. Such gels, when reheated, melt or soften and lose their gel characteristics. It has been proposed also to add to such oil substance such as resins or unsaturated compounds which are capable of being converted to a resinous state by heating. The products, however, have the properties of highly viscous liquids. Gels have distinctive elastic properties and do not change their configuration by liquid flow.

In accordance with my present invention, a desired liquid component is asosciated with a synthetic organic compound capable of polymerization by virtue of at least two double bonds in the molecule, the proportions being such that upon polymerization an elastic stable gel is formed, which, when heated short of a decomposition temperature, or boiling point of one of the components, does not reliquefy, but on the contrary, retains the distinctive elastic properties of gels.

Examples of such multiple double-bonded gelling agents are derivatives of acrylic acid or alpha substituted acrylic acid, such as the esters of such acids formed by combination with polyhydric alcohol, an example being ethylene glycol dimethacrylate. Another type of compound that may be used for this purpose are hydrocarbons containing at least two activated vinyl groups, such as divinyl benzene and divinyl acetylene; and vinyl esters of polybasic acids, such as divinyl succinate, divinyl sebacate, and divinyl maleate. Other such compounds that contain at least two activated double bonds per molecule will suggest themselves to those skilled in the art of resin-formation. Among these are such compounds as the allyl esters and α-methallyl esters of acrylic acid and α-substituted acrylic acids. The allyl and methallyl esters of maleic acid, as well as the glycol esters of maleic acid also are suitable.

Examples of liquids suitable for the formation of gels when thus associated with a polymerizable gelling agent are toluene, xylene, butyl alcohol, ethylene glycol, dichlorethylene, trichlorbenzene, penta-chlorodiphenyl, acetonyl acetone, dibutyl phthalate, glacial acetic acid, diamyl phthalate, butyl benzoyl benzoate, ethyl toluene sulphonamide, diphenyl orthodiphenyl phosphate, dibenzyl sebacate, ethyl ricinoleate, α-dichlorhydrin, and petroleum oils.

It is usually advantageous to include in the gelling agent a quantity of a compound that is capable of polymerization by virtue of a molecular structure providing but one active double bond, as well as one or more compounds which contain at least two active double bonds, since the gels so formed are usually tougher and more transparent. It is desirable, although not necessary, to employ a catalyst, such as benzoyl peroxide.

Some of the gels embodying my invention are tough, elastic, and transparent products, while others are translucent or opaque and rigid, the consistency and appearance of the gel depending upon the proportions and nature of the gelling agents.

Following are specific examples illustrative of my invention, although my invention should not be considered as being limited to these particular examples. The proportions given are by volume, except that the proportion of the catalyst (benzoyl peroxide) is by weight, being 1 gram per 100 cc. of gelling agent.

*Example 1*

A composition of the following ingredients, when heated for about 43 hours at 50° C., results in a water-white, transparent, elastic gel which does not flow under its own weight at 100° C.

| | |
|---|---|
| Ethyl toluene sulphonamide | 20 |
| Ethylene glycol dimethacrylate | 1 |
| Benzoyl peroxide | 0.01 |

Elastic, non-fusible gel compositions may be formed in which the preponderant liquid ingredient is a liquid chlorinated hydrocarbon, such as the following four examples:

Example 2

A composition of the following ingredients, when heated for about 80 hours at 50° C. and for about 22 hours at 75° C., results in a translucent, elastic gel that does not melt at 100° C.

| | |
|---|---|
| Pentachlorodiphenyl | 20 |
| Allyl methacrylate | 2 |
| Benzoyl peroxide | 0.03 |

Example 3

A composition of the following ingredients, when heated first for about 21 hours at 50° C. and then for about 20 hours at 70° C., results in a transparent, water-white, elastic gel that does not melt at 100° C.

| | |
|---|---|
| Trichlorbenzene | 18 |
| Ethyl acrylate | 1.9 |
| Methallyl methacrylate | 0.1 |
| Benzoyl peroxide | 0.02 |

Example 4

A composition of the following ingredients, when heated first for about 24 hours at 50° C. and then heated for about 24 hours at 75° C., results in a transparent, elastic gel that does not melt at 100° C.

| | |
|---|---|
| Pentachlorodiphenyl | 18 |
| Styrene | 1.9 |
| Glycol dimethacrylate | 0.1 |
| Benzoyl peroxide | 0.02 |

Example 5

A composition of the following ingredients, when heated first for 17 hours at 50° C., and then heated for about 5 hours at 70° C., results in a transparent, elastic gel that does not melt at 100° C.

| | |
|---|---|
| Trichlorbenzene | 18 |
| Methyl methacrylate | 1.9 |
| Glycol dimethacrylate | 0.1 |
| Benzoyl peroxide | 0.02 |

The following four compositions, when heated for 24 hours at 50° C. and heated thereupon for 24 hours at 75° C. result in elastic gels:

Example 6

| | |
|---|---|
| Petroleum base cable oil | 16 |
| 2-ethyl hexyl methacrylate | 3.8 |
| Glycol dimethacrylate | 0.2 |
| Benzoyl peroxide | 0.04 |

Example 7

| | |
|---|---|
| Tricresyl phosphate | 16 |
| Isobutyl methacrylate | 3.8 |
| Methallyl methacrylate | 0.2 |
| Benzoyl peroxide | 0.04 |

Example 8

| | |
|---|---|
| Dibutyl phthalate | 15 |
| Methyl acrylate | 3.75 |
| Diethylene glycol maleate | 1.75 |
| Benzoyl peroxide | 0.05 |

Example 9

| | |
|---|---|
| Tricresyl phosphate | 15 |
| Butyl methacrylate | 3.75 |
| Diallyl maleate | 1.25 |
| Benzoyl peroxide | 0.05 |

Example 10

The following ingredients, when heated for about 24 hours at 50° C. and thereupon for about 20 hours at 75° C., become gelled, forming an elastic, translucent body.

| | |
|---|---|
| Ethyl cellulose | 7.2 |
| n-Butanol | 13.8 |
| Trichlorbenzene | 69.0 |
| Glycol dimethacrylate | 0.5 |
| Isobutyl methacrylate | 9.5 |
| Benzoyl peroxide | 0.01 |

It should be noted that in these examples only a minor proportion of gelling agent is required, usually less than about 20 per cent by volume. It should also be noted that the proportion of the total gelling agent which is responsible for the unique properties of the resulting gels constitutes often not more than one-half of one per cent of the total volume of the gel.

All of the above examples include benzoyl peroxide as catalyst. It is not necessary to use such a catalyst, but in the absence of a catalyst the time required for the formation of gel is greater, or the temperature must be higher to produce the gel in a shorter time. This will be apparent to those skilled in the art of resin formation by polymerization.

It is not necessary that the inert liquid should consist of a single chemical compound. Mixtures of liquids or solutions of solids in liquids also may be used, as in Example 10 above. In some cases it may be advantageous to incorporate solid fillers, such as graphite, silica, and pigments in the composition, and it is understood that the composition of the inert liquid may vary widely without departing from the spirit and scope of this invention.

Mineral oil gels of the type described herein are specifically disclosed and claimed in my divisional application Serial No. 386,307, filed April 1, 1941.

What I claim as new and desire to secure by Letters Patent of the United States, is:

1. A stable, non-fusible gel composition comprising the combination of at least 80 per cent by volume of a nonpolymerizable liquid halogenated aromatic hydrocarbon and a polymerized gelling agent consisting by volume of less than 20 per cent of the entire composition, said agent comprising an ester derivative of an acid selected from the group consisting of acrylic acid, and α-substituted acrylic acids, the said ester derivative containing at least two polymerizable double bonds in the molecule.

2. A composition comprising the combination of at least 80 per cent by volume of a non-gelling liquid chlorinated aromatic hydrocarbon, a minor proportion of a polymerizable ester of an acid selected from the group consisting of acrylic acid and α-substituted acrylic acids and containing at least two polymerizable double bonds in the molecule and a second minor proportion of a compound containing but a single polymerizable double bond, said composition being capable of forming a stable, non-fusible gel when heated.

3. A stable non-fusible, elastic gel composition comprising at least 80 per cent by volume of a liquid chlorinated aromatic hydrocarbon and a minor proportion of polymerized ester of methacrylic acid having at least two polymerizable double bonds in the molecule.

4. A stable non-fusible gel composition comprising the combination of a preponderant component consisting of at least 80 per cent by volume of a chemically stable, nonpolymerizable liquid penta-chlordiphenyl and a minor component consisting of a product of polymerization of a plurality of synthetic polymerizable compounds, at least one of which is a methacrylate ester capable of polymerizing by virtue of at least two polymerizable double bonds in the molecule.

5. A non-fusible, elastic gel composition comprising preponderantly penta-chlorodiphenyl and less than 20 per cent by volume of a product of polymerization of an ester of methacrylic acid containing at least two polymerizable double bonds in the molecule.

6. A non-fusible elastic gel composition comprising preponderantly trichlorobenzene and less than 20 per cent by volume of a product of polymerization of an ester of methacrylic acid containing at least two polymerizable double bonds in the molecule.

7. A composition obtained by heat treating a mixture of at least 80 per cent by volume of a liquid chlorinated diphenyl and a mixture of polymerizable compounds consisting of an ester of methacrylic acid capable of polymerizing by virtue of at least two active double bonds and a compound capable of polymerizing by virtue of only one double bond.

8. A composition capable of forming a stable, non-fusible gel when heated comprising at least 80 per cent by volume of liquid penta-chlordiphenyl and less than 20 per cent by volume of allyl methacrylate.

9. A composition obtained by heating under polymerization conditions a mixture comprising liquid penta-chlordiphenyl, glycol dimethacrylate, and styrene, the said penta-chlordiphenyl comprising at least 80 per cent by volume of the mixture.

10. A non-fusible, elastic gel obtained by heat treating a mixture comprising by volume about 18 parts liquid penta-chlordiphenyl, 1.9 parts styrene, and 0.1 part glycol dimethacrylate in the presence of a polymerization catalyst.

11. A non-fusible, elastic gel comprising the heat treated mixture of trichlorbenzene, methyl methacrylate and glycol dimethacrylate, the said trichlorbenzene comprising by volume at least 80 per cent of the mixture.

12. A translucent gel comprising the product obtained from heating a mixture comprising at least 80 per cent by volume of a non-polymerizable liquid comprising trichlorbenzene and minor proportions of glycol dimethacrylate and isobutyl methacrylate.

WINTON I. PATNODE.